J. V. Snider,

Glass Holder.

No. 112,974. Patented Mar. 21. 1871.

Witnesses: Jno. B. Harding. Thos. McIlraw.

J. V. Snider
by his Atty
Howson and Son

United States Patent Office.

JOHN VAUGHAN SNIDER, OF PHILADELPHIA, PENNSYLVANIA.

Letters Patent No. 112,974, dated March 21, 1871.

IMPROVEMENT IN HOLDERS FOR DRINKING-GLASSES.

The Schedule referred to in these Letters Patent and making part of the same.

I, JOHN VAUGHAN SNIDER, of Philadelphia, county of Philadelphia, State of Pennsylvania, have invented a Combined Holder and Drip-Catcher for Drinking-Glasses, of which the following is a specification.

Nature and Object of the Invention.

My invention consists, mainly, in the combination of a drip-catcher with a holder, for soda-water and other drinking-glasses, and also of a method of connecting the holder and drip-catcher so that the latter may remain in a horizontal position when the holder and glass are tilted, all of which will be fully described hereafter.

Description of the Accompanying Drawing.

Figure 1:
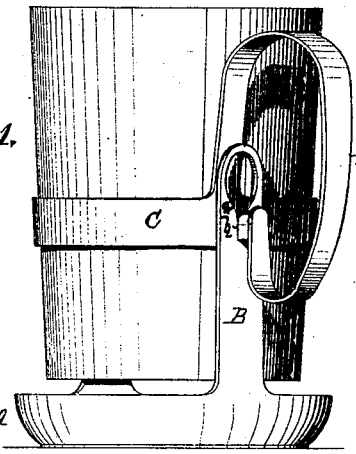
Figure 2:
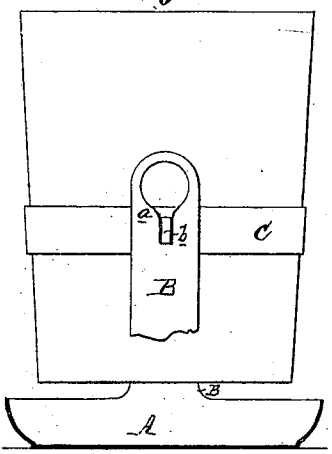
Figure 3:
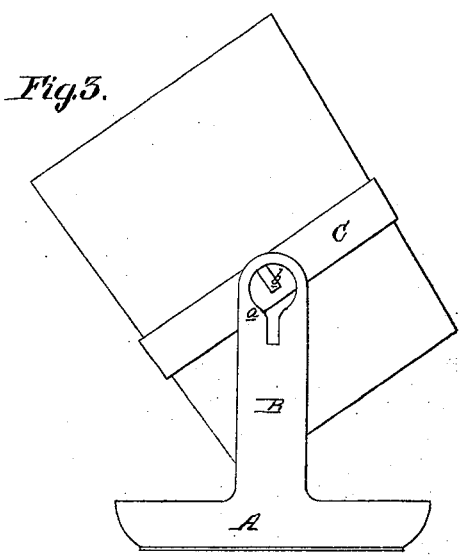

Figure 1 is a perspective view of a drinking-glass and of my combined holder and drip-catcher for the same;

Figure 2, a side view;

Figure 3, the same, showing the glass tilted; and

Figure 4:
Figure 5:
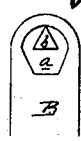
Figure 6:

Figures 4, 5, and 6, views of modifications.

General Description.

The arrangement which I prefer to employ is shown in figs. 1, 2, and 3, where—

A represents a drip-catcher, consisting of a shallow cup or vessel, to which, at opposite points, are secured two posts or arms B, each of which has at its upper end an opening or slot, a, of the peculiar form represented.

The holder proper consists of a band, C, into which the glass is inserted, the said band being supported by lugs or trunnions b b, adapted to the slots a, and being provided with a handle, c, which, in the present instance, is secured at one end to one of the lugs b, and at its opposite end directly to the band.

The lugs or trunnions b are of the same shape as, and are arranged to fit snugly into, the lower contracted portions of the slots a, so as to hold the band firmly in a horizontal position, as shown in figs. 1 and 2, and thus prevent the glass from tilting when the cup or drip-catcher A rests upon any object, such as a counter or table.

When the glass and holder are, however, lifted by means of the handle c, the band and glass will be first raised until the lugs b enter the enlarged upper portions of the slots a. This will permit the said glass to be tilted to any desired angle in the act of drinking from the same; but, as in such case the drip-catcher hangs suspended from the lugs b, it will, instead of being tilted with the glass, remain in a horizontal or nearly horizontal position, as shown in fig. 3, and will, therefore, catch and retain whatever of the contents may overflow and drip from the bottom of the said glass.

The slots a and lugs b may be modified in form, as shown in figs. 4 and 5, or may be of any other shape which will enable the lugs to turn freely in the upper portions of the slots, and be confined and prevented from turning in the lower portions of the same.

In other cases, as, for instance, where the glass has a thick base, or the holder is weighted at the bottom sufficiently to maintain the glass in a vertical position, the lugs b may be simple trunnions, adapted to round holes formed in the arms B, as shown in fig. 6.

The drip-catcher might also, in some instances, be permanently secured to the tumbler-holder; but I prefer that it should be attached to the same, as above described.

Claims.

1. As a new manufacture, a tumbler-holder having at the base a receptacle extending beyond the sides of the tumbler, as set forth.

2. The within-described holder and drip-catcher, consisting of a vessel, A, arms B, and band or holder C, with its handle c and lugs b adapted to slots or openings in the said arms, all substantially as described.

In testimony whereof I have signed my name to this specification in the presence of two subscribing witnesses.

J. V. SNIDER.

Witnesses:
WM. A. STEEL,
F. B. RICHARDS.